W. PALMER.
Velocipede.

No. 233,691.   Patented Oct. 26, 1880.

Witnesses.   Inventor.

2 Sheets—Sheet 2.

W. PALMER.
Velocipede.

No. 233,691.  Patented Oct. 26, 1880.

Witnesses
Henry P. Wells
L. H. Clark Alston

Inventor.
William Palmer by
Duell Wells & Duell
his Attys.

UNITED STATES PATENT OFFICE.

WILLIAM PALMER, OF NEW YORK, N. Y.

VELOCIPEDE.

SPECIFICATION forming part of Letters Patent No. 233,691, dated October 26, 1880.

Application filed January 26, 1880.

*To all whom it may concern:*

Be it known that I, WILLIAM PALMER, of New York, in the county of New York and State of New York, have invented a new and useful Improvement in Three-Wheeled Velocipedes, of which the following is a specification, reference being had to the accompanying drawings.

My invention consists in an improved form of three-wheeled velocipede, whereby it is believed propelling power can be applied to greater advantage and with less fatigue than by any form now in use.

A further and very important feature of my invention is that the space between the rider and the cranks by which it is driven is perfectly free and clear, thus peculiarly adapting my velocipede to female use.

Figure 1:
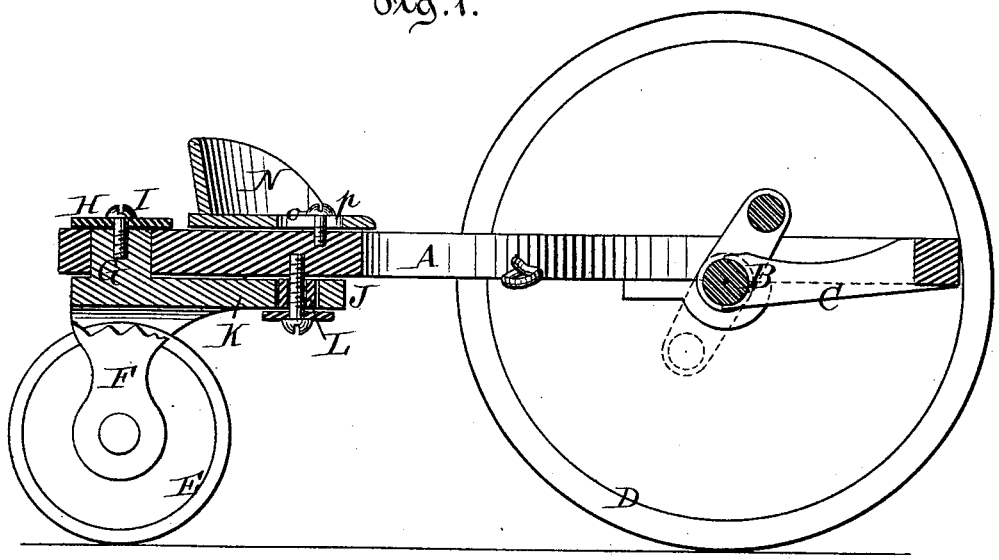
Figure 2:
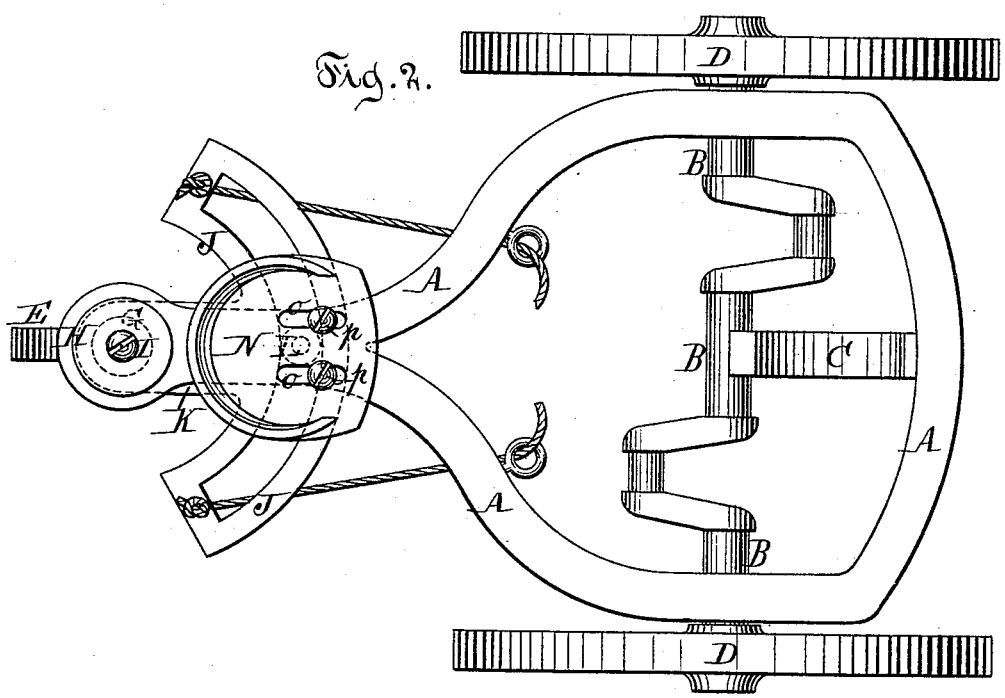
Figure 3:
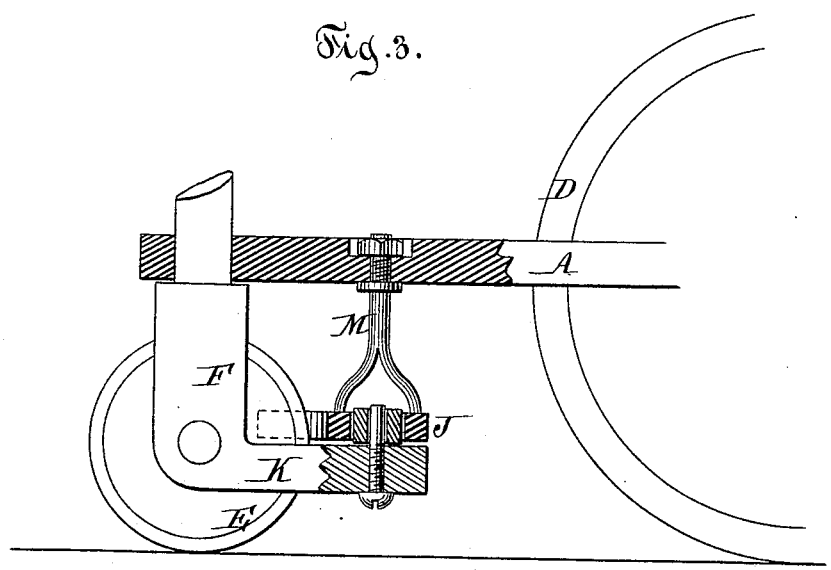

Figure 1 represents an elevation. Fig. 2 represents a plan view of my invention. Fig. 3 represents a modified method of supporting the smaller or rear wheel.

My invention is constructed as follows: A represents a frame of a shape so apparent from Fig. 2 as to render verbal description useless. A double-cranked axle, B, bears on and passes through this frame on appropriate bearings thereto attached, as shown in Fig. 2. The extremities of the axle project without the frame, and upon these the wheels D are placed. One of the wheels D is fixed immovably to the axle, while the other revolves freely thereon, so that the propelling power is applied through one of the wheels D only, while the other is free to adapt itself to the fixed wheel when the velocipede is turning a corner. A strut, C, is fixed at one end to the middle of said frame, while the other end bears against the middle of the axle B, as shown in Fig. 2, so as to give additional support to the axle against the thrust of the feet. Thus the necessity of any brace or support passing between the legs of the rider is obviated, rendering the velocipede peculiarly adapted for use by females—a feature which I regard as of great importance. At the extremity of the frame A most distant from the large wheels D is placed a smaller single wheel, E. The axle of this wheel is fixed in it, and turns in two upright pieces, F, which unite above and embrace the said wheel. The support F is provided with a circular projection or post, G, upon its upper surface—*i. e.*, that in contact with the frame A—which passes through a suitable orifice in said frame. A cap-plate, H, which is larger than the orifice, is united to G by a screw, I, thus securing G in its bearing in the frame A, and forming a pivot on which the support F and its wheel may turn.

The support F is provided with an arm, K, which is extended horizontally toward the end of the frame A which carries the larger wheels D, and underneath and parallel to said frame K terminates in a circular arc, J, provided with a circular slot. A roller, L, lies within the slot, and is secured to the frame A by a cap-plate and screw. Thus the arc and roller answer to the fifth-wheel of a coach, imparting steadiness to the support F and its wheel E, and guiding and limiting their movement on the pivot G; or the method shown in Fig. 3 may be employed, wherein the extension K of the support F is carried forward on a line a little below the axle of the wheel E. The arc is then fixed firmly to the frame A by the strut M, while the roller is attached to the arm K. In this case the roller moves in the slot in the arc as the support F turns, while in the former case the arc moved while the roller was stationary.

The wheel E is the guiding-wheel, and its position and the consequent direction which the machine will take may be governed by steering-lines attached to the extremities of the arc J, or if the support F is constructed as shown in Fig. 3 the steering-lines may be attached to the end of K. I lay no stress on the method by which E is controlled. Any method of the many now in use for a like purpose may be employed.

Upon the upper side of the frame A, and approximately in the position shown, is placed the seat N. The bottom of the seat is provided with two or more slots, *o o*, through which pass the bolts *p p*, which latter secure the seat to the frame A, yet permit its distance from the axle B to be adjusted to suit the rider. The seat N should be provided with a back sufficiently high to support the rider as he works the axle B with his feet.

My device is operated as follows: The rider first adjusts the seat to suit the length of his legs, so that he can follow the cranks on the axle B with his feet through their revolutions. Then seating himself, he works the cranks of the axle B with his feet, while he guides the machine, through the wheel E, with his hands.

Having now described my invention, what I claim as new, and desire to patent, is—

1. In a three-wheeled velocipede, the combination of a frame bearing a seat, and a double-cranked axle provided with two wheels, said axle being supported at or near its center by a strut or brace from said frame, and the whole so arranged that the space between the rider and the axle through which the legs move in the act of propelling the machine is unobstructed, as and for the purpose described.

2. In a three-wheeled velocipede, the combination of the frame, a strut or brace, and a double-cranked axle, substantially as and for the purpose described.

3. In a velocipede, the combination of single wheel and its support, wherein said support is provided with a horizontal extension terminating in an arc having a curved slot, which arc bears against the reach of said velocipede, so as to afford additional support to said single wheel.

In testimony that I claim the foregoing improvement in three-wheeled velocipedes, as above described, I have hereunto set my hand.

WM. PALMER.

Witnesses:
HENRY P. WELLS,
LOT CLARK ALSTON.